(12) United States Patent
Guerci

(10) Patent No.: US 10,868,690 B1
(45) Date of Patent: Dec. 15, 2020

(54) PROGRAMMABLE LOGIC SWITCH AND SYSTEM

(71) Applicant: Massimo Guerci, Campogalliano (IT)

(72) Inventor: Massimo Guerci, Campogalliano (IT)

(*) Notice: Subject to any disclaimer, the term of this patent is extended or adjusted under 35 U.S.C. 154(b) by 0 days.

(21) Appl. No.: 16/635,215

(22) PCT Filed: Aug. 6, 2018

(86) PCT No.: PCT/IB2018/055906
§ 371 (c)(1),
(2) Date: Jan. 30, 2020

(87) PCT Pub. No.: WO2019/030651
PCT Pub. Date: Feb. 14, 2019

(30) Foreign Application Priority Data

Aug. 10, 2017 (IT) .................. 102017000093038

(51) Int. Cl.
*H04L 12/28* (2006.01)
*H04L 12/52* (2006.01)
*H04L 12/40* (2006.01)

(52) U.S. Cl.
CPC ...... *H04L 12/2816* (2013.01); *H04L 12/2834* (2013.01); *H04L 12/40013* (2013.01); *H04L 12/525* (2013.01)

(58) Field of Classification Search
CPC .................................................. H04L 12/2816
See application file for complete search history.

(56) References Cited

U.S. PATENT DOCUMENTS

2014/0100584 A1 4/2014 Chen et al.
2016/0274611 A1 9/2016 Amer et al.

FOREIGN PATENT DOCUMENTS

EP 1892593 A1 2/2008

*Primary Examiner* — Tejal Gami
(74) *Attorney, Agent, or Firm* — David Guerra

(57) ABSTRACT

A programmable logic switch (1) for controlling electrical utilities (3), has multiple control devices (2) of the electrical utilities (3), a serial interface (5) for connecting the switch (1) to an electrical bus (6) to which other switches (1) can be connected. The serial interface (5) is configured for receiving input signals (7) from other switches (1) and transmitting output signals (8) towards other switches (1). The switch (1) comprises an output device (12) having output channels (13) connectable to the electrical utilities (3) and separate with respect to the serial interface (5), and being configured for generating control signals (14) of the electrical utilities (3) as a function of any combination of signals chosen among control signals (4), programming signals (10) and input signals (7), so to control the electrical utilities (3) as a function of a command operated by a user and programming data.

15 Claims, 4 Drawing Sheets

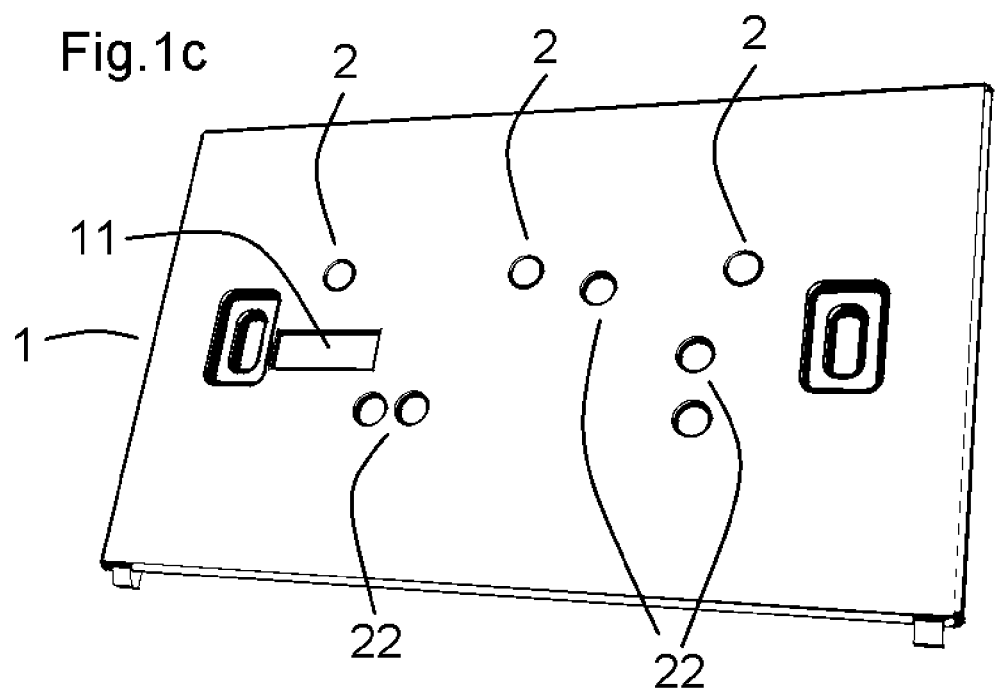
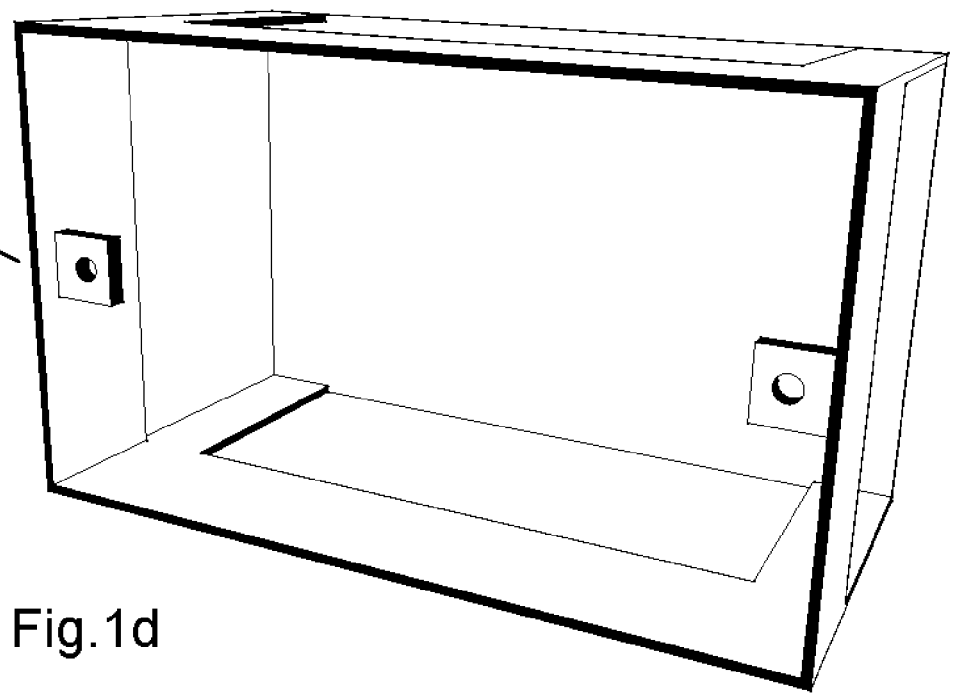

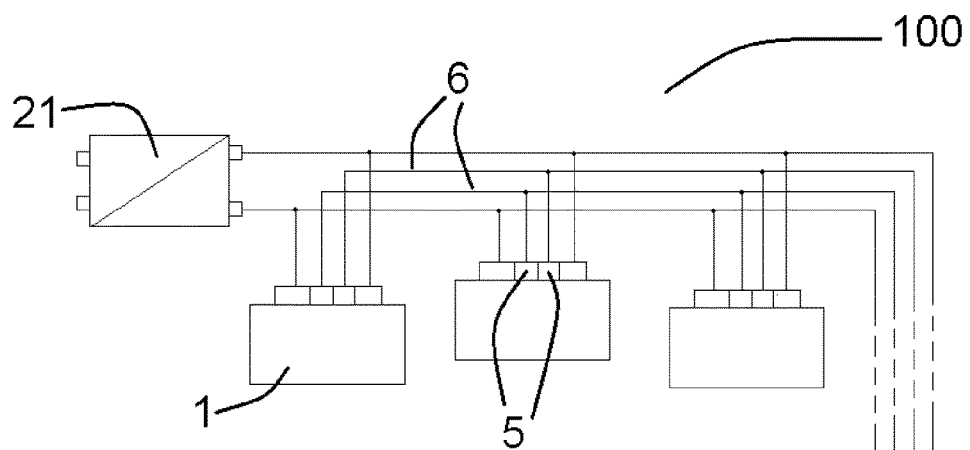
Fig.2
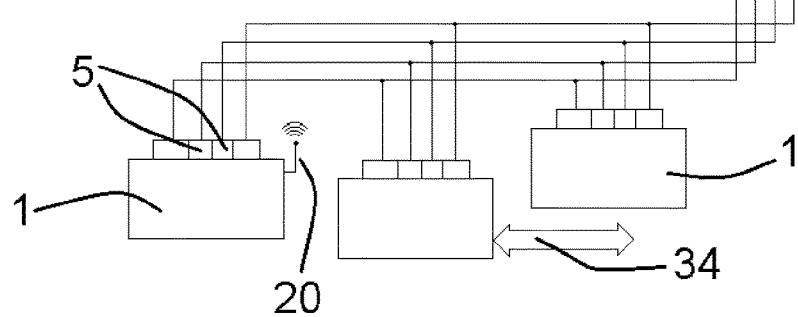
Fig.3
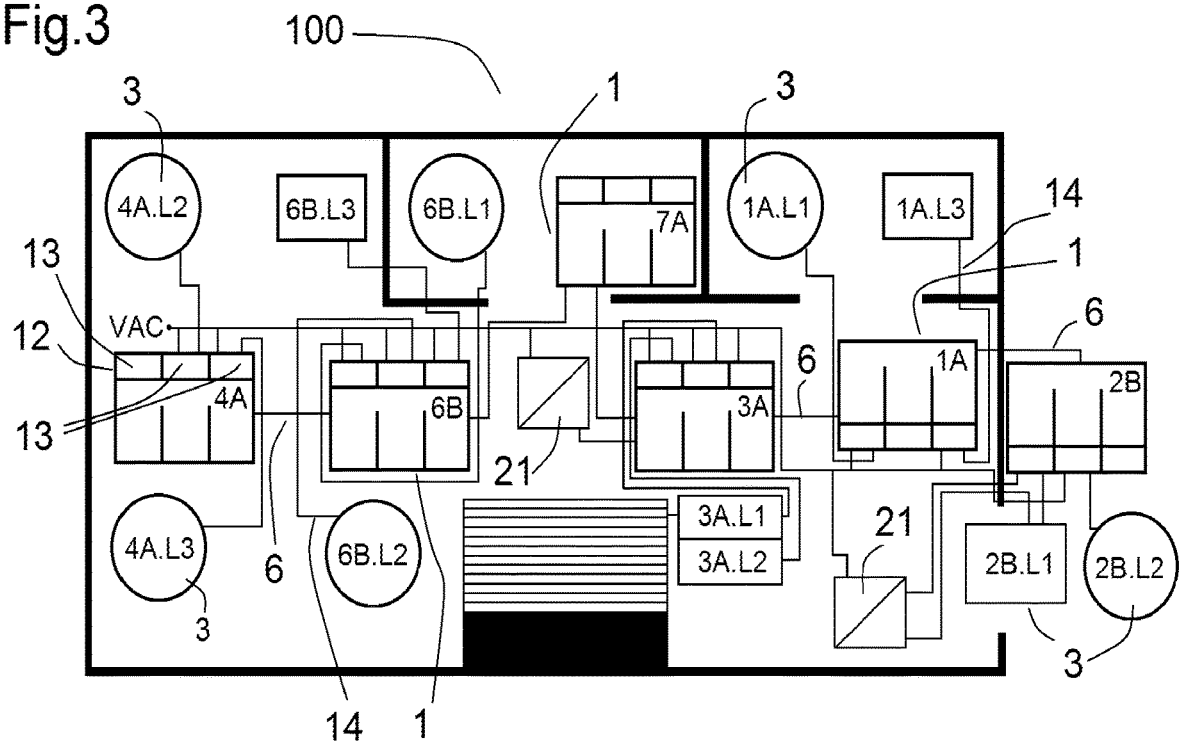

PROGRAMMABLE LOGIC SWITCH AND SYSTEM

TECHNICAL FIELD

The present invention falls within the field of switches which are preferably installed in buildings (house, offices, boxes, . . . ) for the control of electrical utilities (lamps, motors, fans, air-conditioners, solenoid valves) and to receive signals, if any, from external devices such as photocells, timers, detectors.

These switches are preferably (but not exclusively) installed in the common wall boxes and are connected to each other by electric cables.

BACKGROUND ART

Today, the known switch systems provide that, once the switches have been installed on the wall and electrically connected to the respective electrical utilities to be controlled, it is no longer possible to modify the control configuration, or to control different utilities that are not originally provided unless there is an intervention on electrical wiring, masonry works and power distribution in the electric system.

Other known solutions are based on the use of so-called "home automation" systems in which all the devices, including switches and utilities, are connected along a bus connected in turn to a central control unit. The central control unit can be programmed by the user, locally or remotely, to configure the switches and the corresponding utilities that are controlled by the switches.

This system is rather flexible, but it implies several drawbacks due to the fact that:
- the entire electrical system must have been designed according to home automation logics (therefore this system is not applicable to old systems already installed);
- it is necessary to use different "smart" components which entail a significant increase in costs during the construction phase of the electric system.

US 2014/100854 A1 describes a programmable logic switch for controlling electrical utilities, including one or more control devices of the electrical utilities that are operable by a user and configured for generating respective control signals, and a serial interface for connecting the switch to an electric bus to which other switches can be connected.

SUMMARY OF THE INVENTION

In this context, it is an object of the present invention to show a programmable logic switch 1 and a system 100 of programmable logic switches 1 which overcomes the aforementioned problems. The programmable logic switch 1 is called also only switch 1 in the following.

In particular, it is an object of the present invention to provide a switch 1 and a system 100 of switches 1 that allows to be configurable in a flexible manner and without increasing the complexity of the system and the costs too much.

The objects specified are generally achieved by a switch 1 and by a system 100 of switches 1 comprising the technical features set out in one or more of the claims attached to the present description.

The present invention is directed to a programmable logic switch 1 and a system 100 of programmable logic switches 1.

In particular, the system 100 of programmable logic switches 1 allows to command and control, locally and remotely, the various connected electrical utilities located inside houses, offices, boxes, etc., so that, through the programming of the various control devices, it is possible to define from where and how to control the several electrical utilities.

Through successive reprogramming, the initial configurations can be modified and adapted to new requirements that may occur over time, without the need to intervene on the electric wiring, or making the interventions minimal if necessary.

In particular, each programmable logic switch 1 comprises one or more control devices 2 of the electrical utilities 3 which can be activated by a user and configured to generate respective command signals 4.

Preferably, such control devices 2 are buttons/keys or touchscreen displays or other here not expressly mentioned.

Moreover, the programmable logic switch 1 comprises a serial interface 5 for connecting the switch 1 to an electric bus 6 (hereinafter also referred to as "network") to which other switches 1 are connected. This serial interface 5 is configured to receive input signals 7 from other switches 1 connected to the electric bus 6, and to transmit output signals 8 to other switches 1 connected to the electric bus 6.

This serial interface 5 is defined by a two-wire serial connection according to the RS485 standard or similar, or by an ethernet port.

Moreover, the switch 1 comprises a programming interface 9 configured to generate programming signals 10 as a function of programming data inserted locally or remotely.

The programming interface 9 can be represented by microswitches 11 or by a cable connected to the electric bus 6 and by a system 100 for communication with a local or web network for programming.

The programming activity is performed by a user according to which electrical utilities 3 the user wants to command from a specific switch 1.

Moreover, the switch 1 comprises a control unit 24 connected to the serial interface 5 and to the programming interface 9 and configured for:
receiving the input signals 7 from the electrical bus 6,
receiving the command signals 4 from the control device 2,
receiving the programming signals 10,
generating the output signal 8 as a function of the contents of any combination among the input signals 7, the command signals 4, the programming signals 10, and other programming data contained inside the control unit 24 (for example data relating to previous programming operations).

Practically, in this way, the switch 1 sends an output signal 8 on the bus 6 so as to make the data relating to the programming and operation of the switch 1 also available to other switches 1.

Moreover, the switch 1 comprises an output device 12 having output channels 13 respectively connectable to the electrical utilities 3 and separate and independent from each other with respect to the serial interface 5. In other words, the output device 12 is the one that connects the electric utility 3 to the switch 1 to be activated or not.

In detail, each output channel 13 comprises a respective built-in protection fuse 33. It should also be noted that the output channels 13 are independent and may have different supply voltages.

The output device 12 is connected to the control unit 24 and is configured to generate the control signals 14 of the electrical utilities 3 as a function of the contents of any combination among the command signals 4, the programming signals 10 and the input signals 7, so as to control the electrical utilities 3 as a function of the command operated by the user and as a function of the programming data and eventually of the input signals 7 received from the bus 6. In other words, the electrical utilities 3 are also controlled as a function of the contents of the input signals 7.

The control device 2 is configured to send the command signal 4 to the serial interface 5 to be transmitted in the electric bus 6 so that it is available to all the switches 1. It should be noted that in the preferred embodiment, the switch 1 also comprises an input device 15 having input channels 16 respectively connectable to external apparatuses 17 (e.g. sensors, detectors, timers, . . . ) and separated with respect to serial interface 5 and to output device 12. In the case of multiple input channels 16, they are preferably independent of one another.

In detail, each input channel 16 comprises a respective built-in protection fuse 33. It should also be noted that the input channels 16 are independent of each other and may have different supply voltages.

This input device 15 is connected to the control unit 24 and is configured to receive the external signals 18 from the external apparatuses 17 and to send them to the control unit 24. The control unit 24 is configured to generate the output signal 8 as a function of the contents of the external signals 18. Therefore, the output signal 8 also takes into account the status of the external apparatuses 17 which is detected by the input device 15.

It should also be noted that the control unit 24 can comprise a time unit 19 programmable as a function of time and configured to modify the output signal 8 and the control signal 14 of the electrical utilities 3 according to a predefined programming (e.g. daily or weekly or monthly scheduling or more).

In particular, the time unit 19 is configured to execute multiple programs at the same time, each program defining a logical relation between one or more operands, which can be chosen in any combination among the input signals 7, the status of the input channels 16, the command signals 4, the functions contained in the time unit 19, so as to modify the output signal 8 and the control signal 14 of the electrical utilities 3 as a function of time and of said logic relations between the operands above defined. The switch 1 can also automatically activate/deactivate the required electrical utilities, according to criteria defined through the programming interface 9 according to predefined logics and interactions between inputs/outputs/timers/etc. of the various control devices connected to each other in the network.

The switch 1 can also be connected and controlled by a PC by using a dedicated software, and consequently, it can also be controlled via the Internet or email from any device connected to the Internet. In the event that the switch 1 is connected and controlled by a PC, a connection interface 34 (preferably RS485/Ethernet) is present.

It should be noted that it is possible to interact with switch 1 with the keys of the control device 2, as well as by a remote control 20.

According to another aspect of the present invention, the programming interface 9 can be configured in an "administrator" mode in which the programming interface 9 accepts the insertion of new programming data and in an "operation" mode in which the programming interface 9 does not accept the insertion of new programming data. Preferably, the programming interface 9 can be configured in the "administrator" mode if an unblocking signal is sent through a predefined combination (password) of the control devices 2 which are connected to the programming interface 9 or through the control by a software of a PC connected to the interface 34.

Moreover, the output device 12 can be configured in a "local" mode, in which it generates control signals 14 of the electrical utilities 3 only as a function of the contents of the command signals 4 and of the programming signals 10 but not of the input signals 7, or in a "remote" mode in which the output device 12 generates control signals 14 of the electrical utilities 3 also as a function of the contents of the input signals 7 and of the programming data contained within the control unit 24. In addition, the programming interface 9 can be configured in the "association" mode in which it is substantially envisaged to associate a push of any button of the control devices 2 to the control of any utility 3.

The "association" mode provides that upon activation of a control device 2, an output signal 8 is generated containing the information on the activated control device 2 (key pushed) to be associated and which allows the remaining switches 1 connected to the bus 6 to receive the respective input signal 7 and associate said control device 2 to all of its output channels 13 which are active at that moment.

In other words, the "association" mode allows, by appropriately programming the switch, to associate the keys pushed on the switch itself, with the output channels currently active on all the switches connected to the network. Therefore, in the remote mode, the associated keys will control the respective associated output channels.

A system 100 of programmable logic switches 1 also forms the subject of the present invention, comprising a plurality of the previously described programmable logic switches 1, in which said switches 1 are connected to each other along an electric bus 6.

Preferably, the system 100 comprises at least one first electrical utility 3 connected to an output channel 13 of an output device 12 of a first switch 1. The input signals 7 of a switch 1 correspond to the output signals 8 of other switches 1 connected along the electric bus 6.

The output device 12 of the first switch 1 is configured to generate the control signal 14 of said first electrical utility 3 as a function of the data contained in the output signal 8 received from one or more different switches 1 connected along the electric bus 6. In this way it is possible to control electrical utilities 3 connected electrically to a switch 1 by means of other switches 1 which are connected along the bus 6.

BRIEF DESCRIPTION OF DRAWINGS

Further features and advantages of the present invention will appear more clearly from the indicative, and therefore not limiting, description of a preferred but not exclusive embodiment of a switch 1 and a system 100 of switches 1, as illustrated in the accompanying drawings, in which:

FIGS. 1a, 1b, 1c, 1d show different views of the switch 1 according to the present invention;

FIG. 2 shows a schematic view of a system 100 of switches 1 connected along a bus 6 according to the present invention;

FIG. 3 shows a schematic view of an example of installation of the system 100 of switches 1.

In the following description, the identical reference numerals indicate parts identical or corresponding in the different views.

DETAILED DESCRIPTION OF THE INVENTION

Figure 1A:
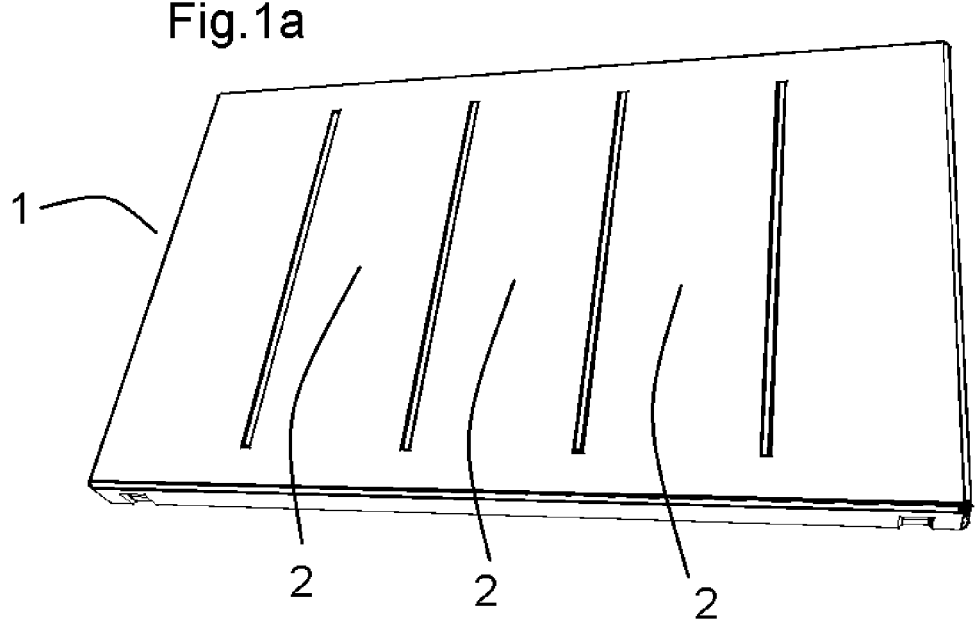
Figure 1B:
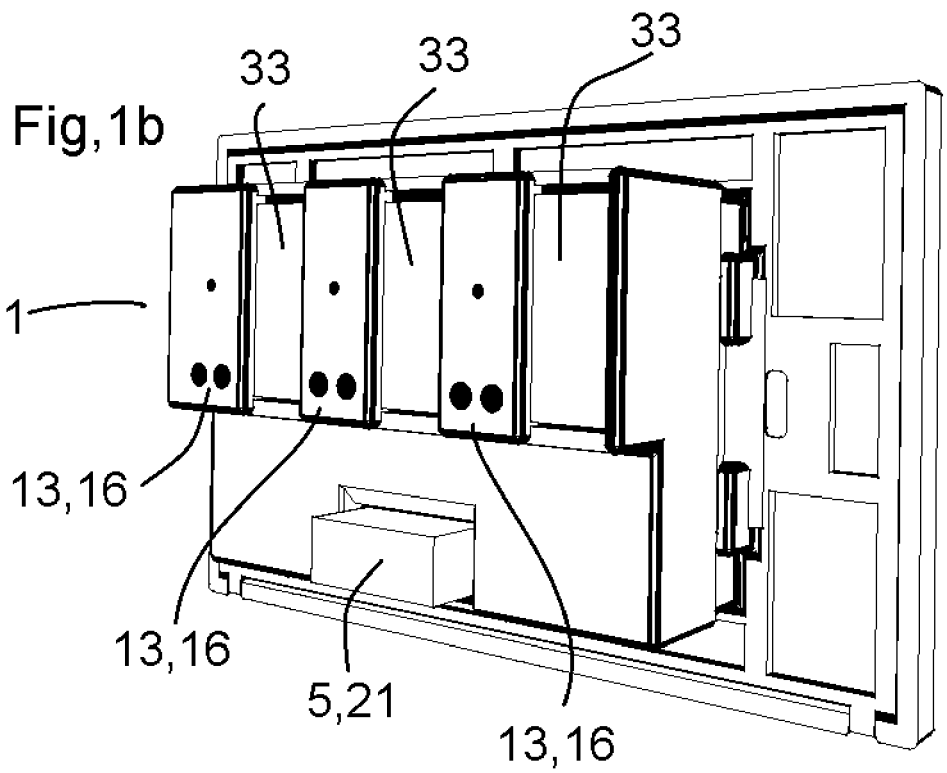

The system 100 consists of switches 1 connected to each other by a bus 6 (preferably an industrial RS485 serial network). This network allows the devices to communicate even at great distances.

Each device has a serial interface 5 (RS485), three keys and some microswitches 11 for programming, some LEDs 22, and three input channels 16 or output 13 of the input device 15 or output device 12. Three of the LEDs 22 display the status of the three input channels 16 or output channels 13. Each device must be powered by a power supply 21 for the control unit 24 and for the serial connection.

Each switch 1 must be programmed with its own identification address (node) in order to be able to communicate with the other switches 1 in the serial network.

In a same network there can be switches with the same "node" (alias), whose operation and behavior are defined according to the relative programming. Such "alias" switches advantageously allow the keys of a second switch 1 connected to the same network as a first switch 1 to be replicated.

The RS485 serial communication is carried out through proprietary software protocol (DOCprotocol).

Each switch 1 can be housed in wall boxes 23 for common mechanical switches and does not require connection to the ground system.

In other words, each switch 1 extends frontally and has a rear volume. Said rear volume is such as to fit into a wall box 23 commonly used for known switches. The front dimensions are conformed to the front dimensions of the box 23.

From the figures it is also possible to note that each switch 1 comprises fuses 33 each associated with a respective input/output channel 16, 13. In particular, the switch 1 has posteriorly housings suitable for facilitating the insertion and removal of said fuses. The rear volume with the fuses 33 is such as to be included in the dimensions of known wall boxes.

Each input/output channel 16, 13 is opto-isolated from the control electronics and the RS485 serial network, and is completely independent and electrically isolated also from all other channels. Therefore, an input channel 16 can control, for example, a sensor powered at 12 V DC, and another input channel 16, on board the same device, can control a sensor powered at 24 V DC. The same applies to output channels 13 on board of an output device 12.

Input channels 16 can receive information from other devices external to the system 100 (photocells, push-buttons, switches 1, timers, presence or movement detectors, or contacts in general from sensors or other electronic devices external to the system 100).

The output channels 13 control the electrical utilities 3 connected to them (lamps, motors, fans, solenoid valves, electrical locks, shutters, relays, contactors, or other devices).

Each output channel 13 can be programmed so that it can be activated/deactivated on command, permanently, or automatically shut off after a settable time.

Each output channel 13 can also be programmed in such a way that its activation is inhibited if another output channel 13 on board of the device is already active (e.g. shutter opening/closing interlocking).

Some output channels 13 can be programmed to be activated automatically when another output channel 13 is activated, on board of the same device, and turn off automatically after a time that can be set when the reference channel has been deactivated (e.g. light and fan switching on in a bathroom).

The output devices of each switch 1 can be programmed (preferably via the programming interface) to control the output channels 13 by means of a password, which can be entered via the keys of the control device 2 (e.g. opening of an electrical lock from the outside of a room).

Switches 1 which have output devices can also operate individually, without the need to be connected to the other switches 1.

Switches 1 which have input devices 15 are only for the use of switches 1 with output devices, and allow to extend the programming capabilities and functions of the switches 1 with output devices. In fact, in this case, the control unit 24 is configured to relate the status of the various signals of the input channels 16 and output channels 13 exchanged in the network, by simple logics AND, OR, XOR, NOT and timers, so as to automatically activate/deactivate the output channels 13 with respect to all the other switches 1 connected in the network, greatly extending the possibilities of application of the whole system 100 (e.g. activation, with timer, of solenoid valves for watering).

Practically, the control unit 24 has one or more programs running in a parallel and independent way from each other, wherein each of the programs determines a predefined relation in any combination of signals chosen among the input signals 7, the external signals 18, the command signals 4, the programming signals 10, the control signals 14 of the electrical utilities 3, so to generate the output signal 8 that, in use, is received from other switches 1 connected to the electrical bus 6 as an input signal 7. The switches 1 can be programmed by means of appropriate software running on a PC connected to the RS485 serial network of the system 100 through the interface 34 (Ethernet/RS485).

Alternatively, the switches 1 can be entirely programmed locally also by means of keys, microswitches 11 and LEDs located on board of the devices themselves.

The combination of microswitches 11 defines the function to be programmed; the keys are used to program the various configurations of the selected function. Some LEDs indicate the setting made.

Each switch 1 is equipped with a cover (FIG. 1a) that fits on the front of switch 1, after installation inside the wall box. This cover is configured to be able to interact with the system 100 and to allow a comfortable key pushing.

This cover is advantageously flush with respect to the box during the closing condition (preferably by joint).

Switch Power Supply

Each switch 1 must preferably be supplied with a DC voltage, and the terminals of the two-wire bus 6 of the RS485 network are connected in parallel to all the switches 1 connected in the network, as shown in FIG. 2.

FIG. 2 also shows switch 1, interface 34 (Ethernet/RS485) and a receiver for remote control.

The serial communication along the bus 6 among all the connected switches 1 is preferably of a multi-master type.

Operating Mode

Each switch 1 has three operating modes: "administrator", "local", and "remote".

The "administrator" mode is used to access the programming of switch 1. In this case, the microswitches 11 allow to select the function to be programmed. The selected function is configured by using the keys and the LEDs on board of the switch 1. The programming of the switch 1 can also be carried out via the RS485 network by using a dedicated software running on a PC (the PC must be connected to the switch 1 via the Ethernet/RS485 interface).

The "local" mode is used to control the individual output channels 13 of the switch 1, by pushing the buttons on board of the switch 1. In "local" mode, the switch 1 does not switch the output channels 13 of the output device 12 as a function of the signals received via the bus 6. The "local" mode also serves to associate the keys of the switch 1 to the output channels 13 of all the switches 1 connected in the network. The "remote" mode allows to control the output channels 13 of the switches 1 connected in the network, depending on the pushing of the keys and the status of the input/output channels 16, 13 of any other switch 1 also connected in RS485 network, following the rules programmed in the various switches 1.

For communicating in "remote" mode, each switch 1 must be set with a network address (node).

Multiple switches 1 can be set with the same identification address (alias switches 1) so as to increase the maximum number of switches 1 that can be connected to the same network, and to replicate the functions of the buttons of the switch 1 with the same node.

Multiple networks can be connected together via PC and interface 34. In this case, a software running on the PC can relate the key signals and the status of the output channels 13 and input channels 16 of the switches 1 of a network with those of the other one, in order to control the output channels 13 of the switches 1 of both the RS485 networks.

Through appropriate software on PC, it is also possible to track and record on disk all the network activity of connected switches 1, and to schedule actions on the occurrence of certain events (for example, the PC can be programmed to send an email if a presence or movement sensor is activated).

Switches 1 with output channels 13, if in "Remote" mode, can activate/deactivate their output channels 13 autonomously, even without being connected to the network, by programming the keys on board of the switch 1 and the operating modes set for its output channels 13.

Operation for Output Channels of Output Device

Each output channel 13 can be programmed to operate in various ways, depending on the type of connected electric utility 3.

The combination of the microswitches 11 of the programming interface 9 determines the possible settings for each channel.

For each output channel 13, a password can be associated which allows to activate and deactivate the connected electric utility 3, if the switch 1 is in "Remote" mode, when the relative code is entered using the keys. The output channel 13 turns on/off following the set operating mode.

If for example an output channel 13 is set with an impulsive operating mode, by typing the relative password while the switch 1 is in "Remote" mode, the channel will be activated for the programmed impulsive time (e.g. to control an electric lock from the outside of a room).

In "Remote" mode and in "Association" mode, each time one of the keys is pushed (if no password is assigned to any of the output channels 13 of the switch 1), the switch 1 emits a signal in the network where own address and pushed key are indicated. If the microswitches 11 of the transmitting switch 1 are set with a predefined code, and the switch 1 is in "association" mode, the transmitted signal contains the information necessary to define that the key indicated in the telegram must be associated with the output channels 13 at that time active on the receiver switch 1 or on the receiver switches 1.

Each switch 1 with the output channels 13, keeps in its internal memory, for each output channel 13, all the associated keys for all the switches 1 connected in the network.

Interlocking of the Output Channels

Each output channel 13 can be set to not be activated if the other output channels 13 on the same switch 1 are already active, or if a pre-settable time has elapsed since their deactivation.

The function and interlock time can be activated for each individual output channel 13.

The interlock works only between the output channels 13, on board of the same switch 1, which have the interlock function enabled. This function is advantageously useful, for example, for activating an interlock between the opening and closing of shutters. The channel interblocking timer starts when the channel turns off. The other channels will not be able to activate until this time has elapsed.

Example of Application of the System of Programmable Logic Switches

FIG. 3 shows the plan of a hypothetical house/office/workshop with some rooms in which are installed electrical utilities 3 (lamps, shutter, electric lock, fans) controlled by a system 100 of programmable logic switches 1 (PLS) connected to each other on the network.

The various wiring, the power supplies, the network connection between the various switches 1, the network addresses of the switches 1, and the relative nomenclatures of the electrical utilities 3 according to their connection to the switches 1 are schematically shown.

By programming the associations of the output channels 13 with the keys of the switches 1, and the configuration of the operating mode of the output channels 13, it is possible to decide to control the electrical utilities 3 in various ways.

For example, the outlet channel 13 of the bathroom fan 1A.L3 is programmed to turn on automatically when the lamp 1A.L1 is turned on, and to turn off automatically five minutes after the lamp 1A.L1 has switched off.

In the same way, the electric lock 1B.L1 of the entrance door is controlled, from outside the home, by means of the switch 2B, whose output channel 13 is configured to act in an impulsive manner with pulse time of 0.2 seconds, and with a password that can be entered by using the buttons of switch 2B.

Talking LEDs

Figure 4A:
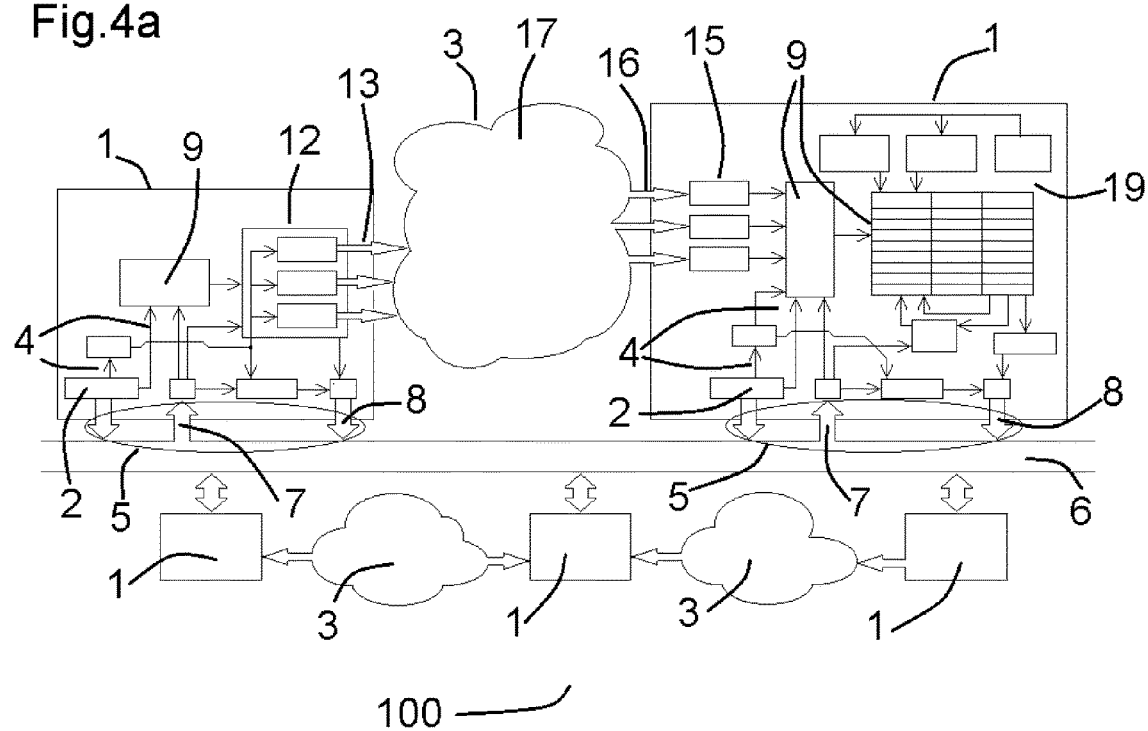
FIG. 4a is a schematic view of the system 100 of switches 1 connected to the electric bus 6 according to a functional logic.
Figure 4B:
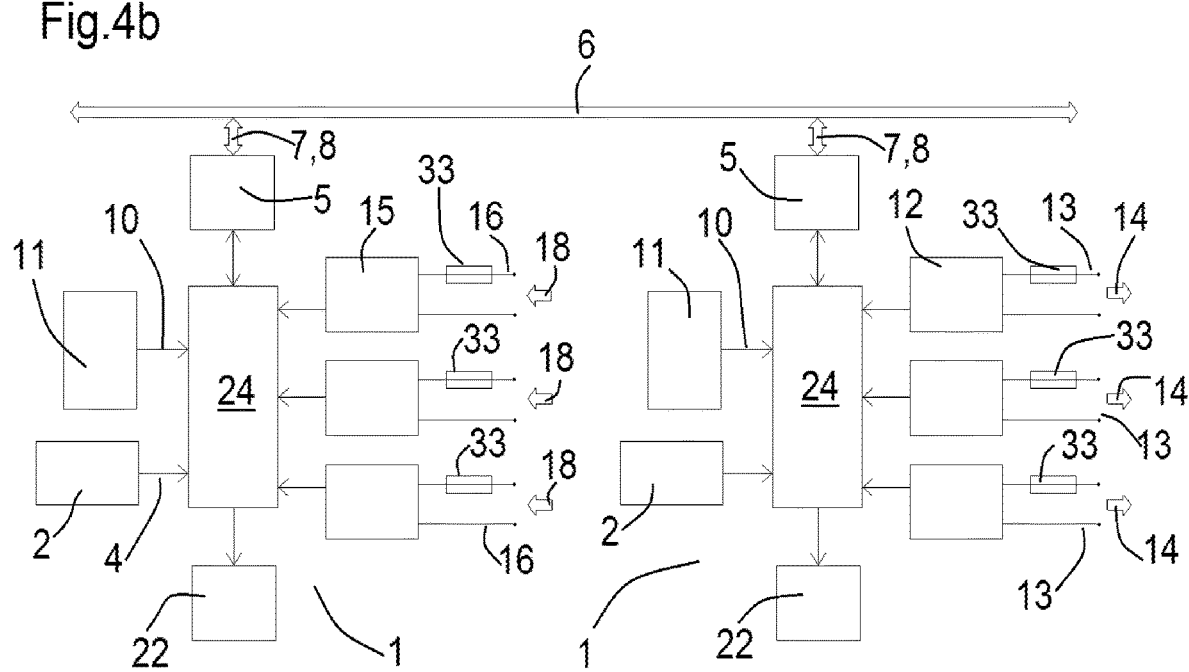
FIG. 4b shows a schematic view of the system 100 of switches 1 connected to the electric bus 6 applied to some utilities.

As shown in FIG. 4b, the switch 1 comprises LEDs 22 associated to input channels 16 and output channels 13, which always indicate the "active" or "inactive" status of the related channel.

In particular, they are switched on with a steady light if the status of the relevant channel is active or are switched off if the status of the relevant channel is deactivated.

Other two LEDs 22 indicate, by means of the switching on or flashing mode, the function active at any time, or the function being programmed or its value.

Programming

Each switch 1 with input channels 16 has some weekly calendars (FIG. 4a), used to manage and synchronize the configurable programs that allow commands to be sent to the other switches 1 through a network connection.

For each weekly calendar, the activation date and time and the deactivation date and time can be configured.

In addition, each switch 1 with input channels 16 has a clock, used to activate/deactivate the weekly calendars.

In other words, the periodic calendars define additional input variables that are included in the programming signals for the processing performed by the control unit 24. In practice, the calendars are further operands of the programs that are processed by the control unit 24.

Each switch 1 with input channels 16 has some configurable programs which allow to extend the functionality of the entire system 100 of programmable logic switches 1 installed.

Through these programs, the switches 1 connected to each other in the network, can exchange information on the status of the inputs and outputs of the entire system 100, and relate them to each other through simple binary operations AND, OR, XOR and NOT, so as to be able to automatically activate/deactivate the output channels 13 available throughout the system 100, depending on the logics to be implemented.

Compare a traditional processor system with the system 100 of programmable logic switches 1 according to the present invention. In the traditional processor system the data lie within the system itself and the instructions are executed one after the other according to the implemented flow control; even in the case of several traditional connected processors among them in the network, each processor would execute the instructions sequentially, according to the programmed flow control. In the system 100 of programmable logic switches 1 according to the present invention, each program of each switch 1 can be considered as a single instruction of the traditional processor. These instructions (the programs) no longer follow a predefined and sequential flow control, but are executed in parallel and independently from each other according to time bases and events defined for each of them.

The events such as keystroke, photocell status or output channels, etc. that condition the execution of the single instructions (programs), constitute the data of the system 100, and are distributed, shared between the various switches 1, and rendered available to all instructions (programs), via the network to which all switches 1 that form the entire system 100 are connected.

The instructions (programs) of the system 100, by reading and modifying the data of all switches 1 via the network connection, determine the intensity of the data traffic that is generated from time to time in the system 100.

The switches 1 and the system 100 described above allow to achieve the intended purposes.

Advantageously, the system 100 allows to control electrical utilities that are connected to any one of the switches 1 along the bus, through any of the other switches 1 connected along the bus after appropriate programming.

In particular, the system 100 of programmable logic switches 1 is designed to be economical, flexible, and easy to install, making extremely easy and quick to define and configure from which stations to control the various electrical utilities 3 located inside houses, offices, sheds, boxes, etc. without the need to intervene on electrical wiring, or making them minimal if they were necessary; the system 100 is expandable and allows the addition of other functionalities which allow to automate, in a customizable way and without additional costs, the control and use of the various connected electrical utilities 3.

The configurations and programs available in switches 1 are not present in the current home automation systems and allow the user to be freed from the wiring.

The network connection between the switches 1, allows to control electrical utilities 3 also located at great distances between them. Moreover, the opto-insulated input 16 and output channels 13 allow to connect the external apparatuses 17 and the electrical utilities 3 with different supply voltages.

The reduced dimensions of the switches 1 allow an immediate installation in the wall-mounted boxes for the normal mechanical switches, and also make it possible to immediately replace a block of known mechanical switches with a switch 1 according to the present invention.

Furthermore, no other junction boxes are required, but simply insert and connect the power supply into the main box of the electrical system.

Switches 1 with output channels 13 can be configured to operate independently, or to be connected with several switches 1 to each other via the network.

The system 100 can be entirely programmed by means of the keys and the LEDs on board of the switches 1 themselves.

The systems according to the present invention also enable the electrical utilities 3 to be controlled, with different levels of security, by entering passwords.

Therefore, the systems of programmable logic switches 1, combine the typical features of home automation with the flexibility features of PLCs (programmable logic controllers) used in industry and, together with the key associations and the programs running parallel on the various switches 1, allow multiple configurations of automation to be implemented, and, in an economic and fast way, all the needs that can emerge from time to time to be satisfied, without the need of programming experts.

The invention claimed is:

1. A programmable logic switch for controlling electrical utilities comprising:
   one or more control devices of the electrical utilities, activatable by a user and configured for generating respective command signals;
   a serial interface for connecting the switch to an electrical bus to which other switches can be connected,
   characterized in that said serial interface is configured for receiving one or more input signals from other switches connected to the electrical bus, and for transmitting one or more output signals towards other switches connected to the electrical bus;
   the switch further comprising:
   a programming interface configured for generating one or more programming signals as a function of programming data entered locally or remotely;
   a control unit connected to the serial interface and to the programming interface, and being configured for:
   receiving the input signals from the electrical bus,
   receiving the command signals from the control device,
   receiving the programming signals,
   an input device and output device having one or more input channels and one or more output channels respectively connectable to external apparatuses and electrical utilities and separate with respect to the serial interface; said input device and output device being connected to the control unit and being configured for generating one or more control signals of the electrical utilities or for receiving one or more external signals from the external apparatuses;

said control unit being configured for generating an output signal as a function of the contents of any combination among the input signals, the command signals, the programming signals, other programming data contained in the control unit, and the external signals.

2. The switch according to claim 1, characterized in that the control unit is further configured for generating an output signal as a function of the contents of one or more input signals which originate from other switches present on the electric bus.

3. The switch according to claim 1, characterized in that the control device is configured for sending the command signals to the serial interface for being transmitted into the electrical bus.

4. The switch according to claim 1, characterized in that said output device is connected to the control unit and is configured for generating said control signal of the electrical utilities at least as a function of the contents of the command signals, the programming signal and/or the input signal, so as to control the electrical utilities at least as a function of the command operated by the user and as a function of the programming data.

5. The switch according to claim 1, characterized in that said input device is connected to the control unit and is configured for receiving one or more external signals from the external apparatuses and for sending the external signals to the control unit; said control unit being further configured for generating an output signal as a function of the contents of the external signals, the command signals, the programming signal and/or the input signal.

6. The switch according to claim 1, characterized in that the control unit comprises a time unit programmable as a function of time and configured for modifying the output signal and/or the control signal of the electrical utilities as a function of a predefined programming.

7. The switch according to claim 1, characterized in that the programming interface is configurable in an "administrator" mode in which the programming interface accepts the insertion of new programming data and in an "operation" mode in which the programming interface does not accept the insertion of new programming data.

8. The switch according to claim 7, characterized in that the programming interface is configurable in the "administrator" mode if an unblocking signal is sent via a predefined combination of the control devices which are connected to the programming interface or if such an unblocking signal is sent via an external computer connected to the switch via the electrical bus.

9. The switch according to claim 1, characterized in that the output device is configurable in a "local" mode, in which the output device generates control signals of the electrical utilities only as a function of the contents of the command signals and the programming signal but not of the input signal, or in a "remote" mode in which output device generates control signals of the electrical utilities also as a function of the contents of the input signal.

10. The switch according to claim 1, characterized in that it is configurable in an "association" mode, in which the control unit is configured for generating an output signal containing information on the activated control device to be associated to the output channels active at that instant on other switches connected to the electric bus.

11. The switch according to claim 1, characterized in that said control devices are arranged "in view" according to an installation surface, and in that the serial interface, the programming interface, the control unit, the output device and the input device are arranged posteriorly with respect to said control devices so as to define a rear volume of the switch; said rear volume being smaller than a cavity defined internally of a common wall box so that the rear volume can be housed therein.

12. The switch according to claim 1, characterized in that the control unit has one or more programs run in parallel mode and independently of one another, wherein each of the programs defines a predefined relation between any combination of signals chosen among the input signals, the external signals, the command signals, the programming signals, the control signals of the electrical utilities so as to generate said output signal that, in use, is received by other switches connected to the electric bus as an input signal.

13. A system of programmable logic switches, comprising:
a plurality of programmable logic switches, wherein said switches are connected to one another along an electrical bus; each switch being identified by an own identifying address on the electrical bus;
at least a first electric utility connected to an output channel of an output device; input signals of a switch corresponding to output signals of other switches connected along the electrical bus; said input signals comprising information relating to the identifying address on the electric bus of the switch from which the information has been sent; said output signals comprising information relating to the identifying address on the electric bus of the switch from which the information has been sent.

14. The system according to claim 13, characterized in that the output device of a first switch is configured for generating a control signal of said first electric utility as a function of the data contained in the output signal, received from one or more different switches connected along the electric bus.

15. The system according to claim 13, characterized in that any switch connected to the electrical bus set with the same identification address of a second switch increases the maximum number of switches connected to the same network and replicate the functions of the control device of said second switch with the same identification address.

* * * * *